May 14, 1929.    J. T. HUME    1,712,958
IRONING MACHINE
Filed Nov. 19, 1924    9 Sheets-Sheet 4
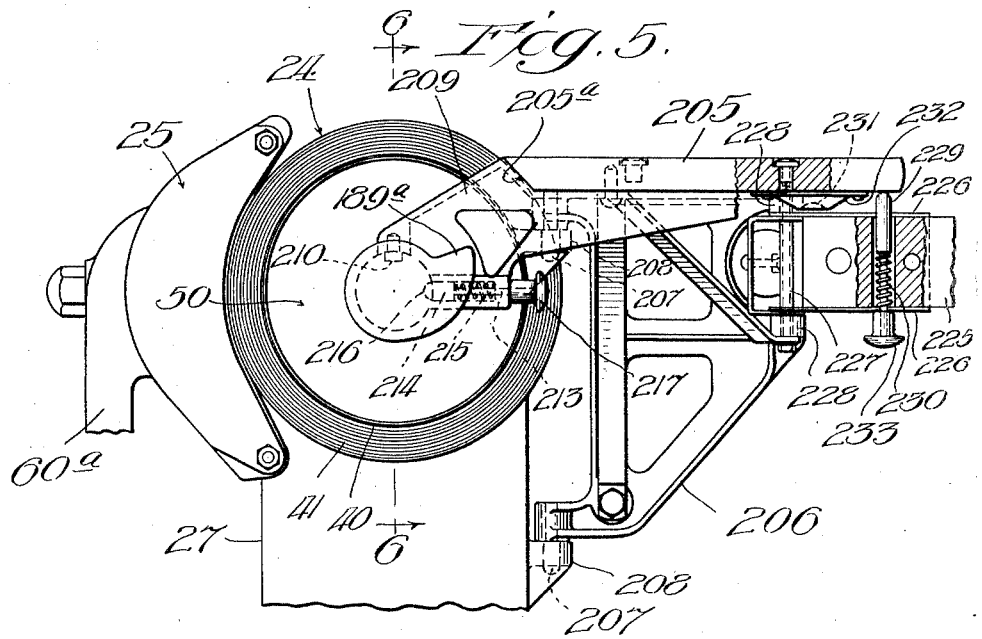
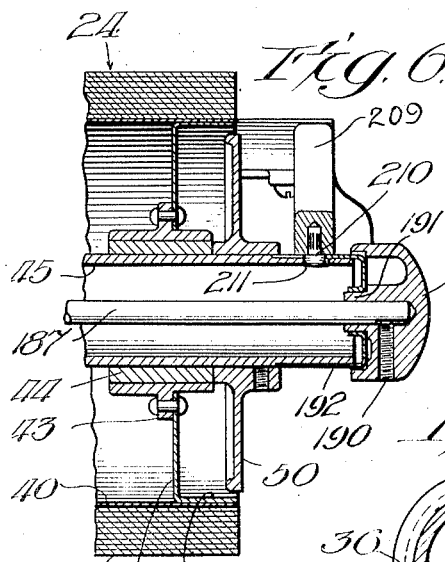
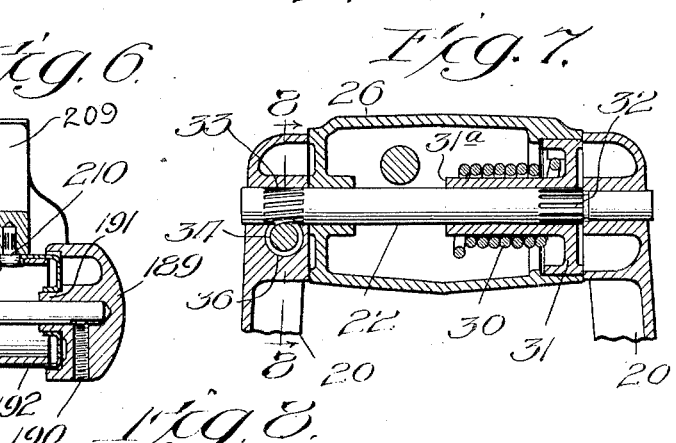
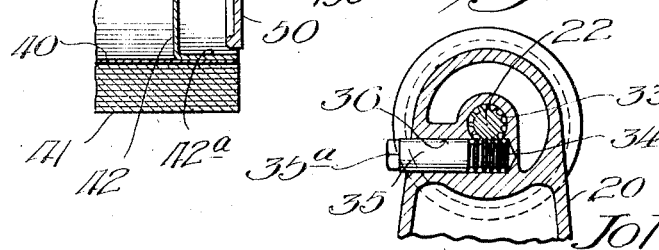
Inventor
John T. Hume
by Rector, Hibben, Davis & Macauley
Attys

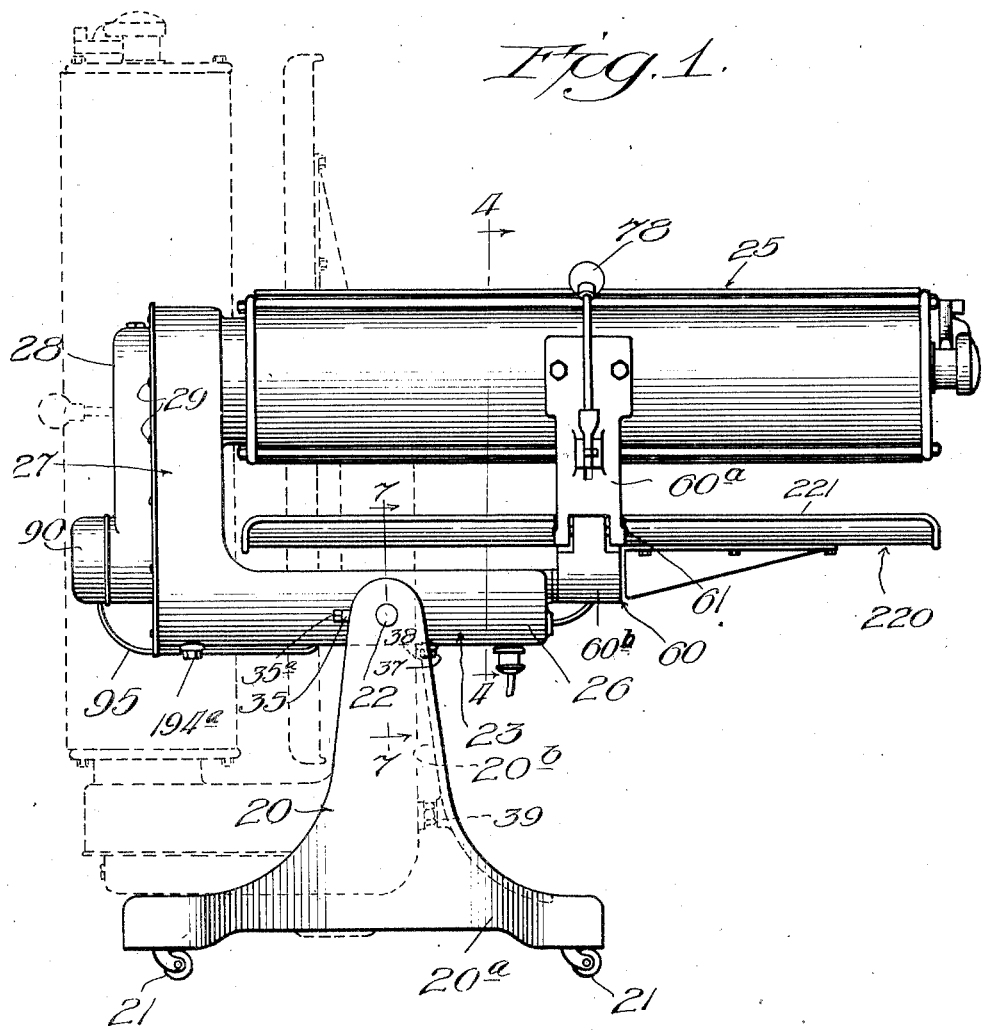

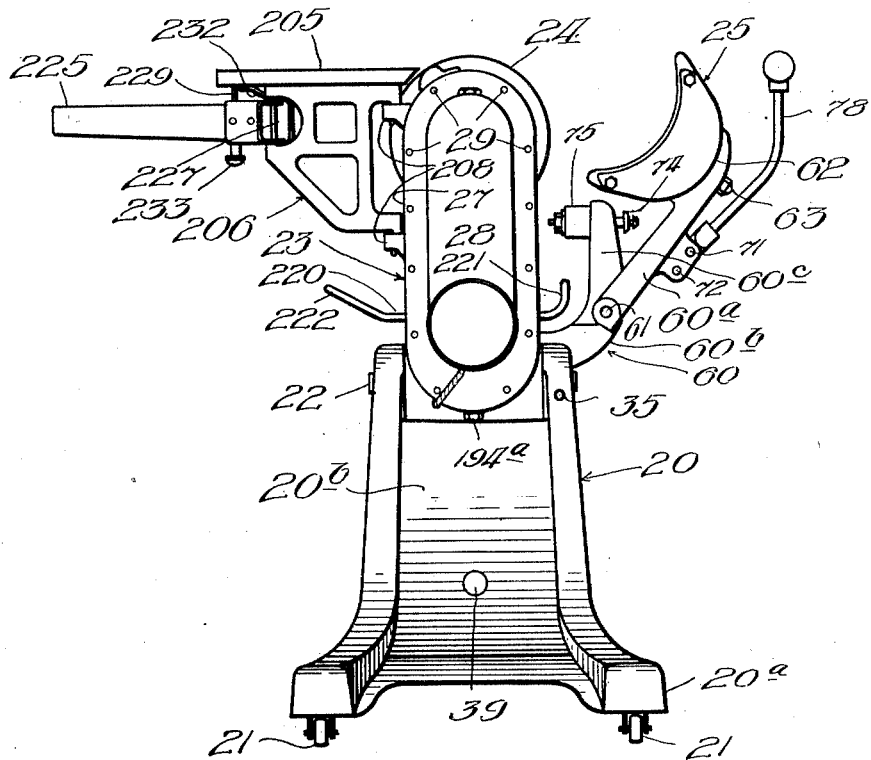
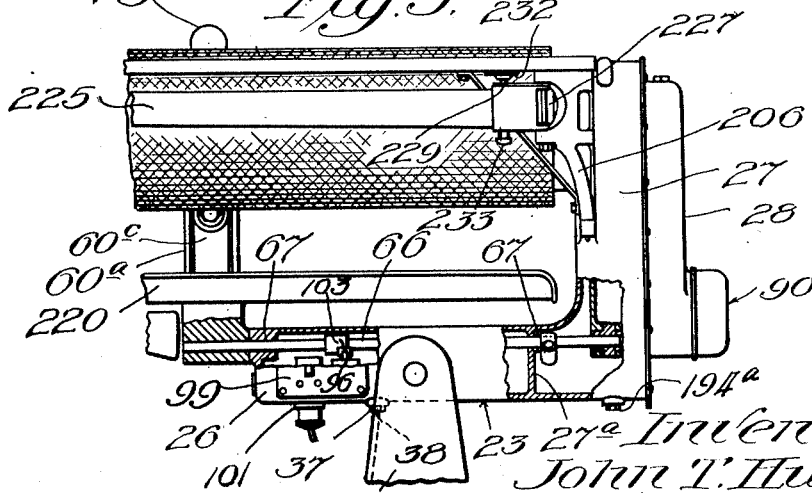

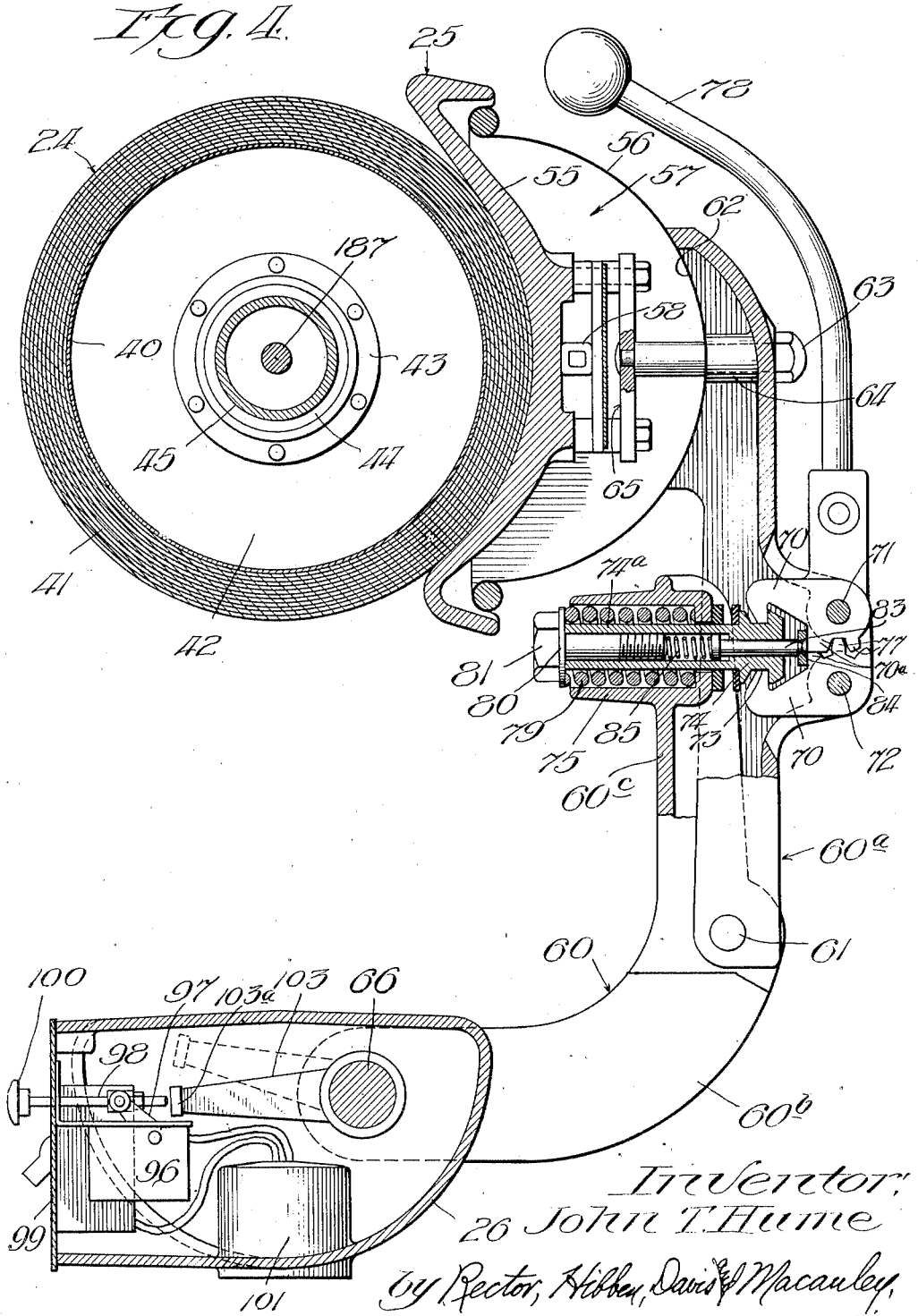

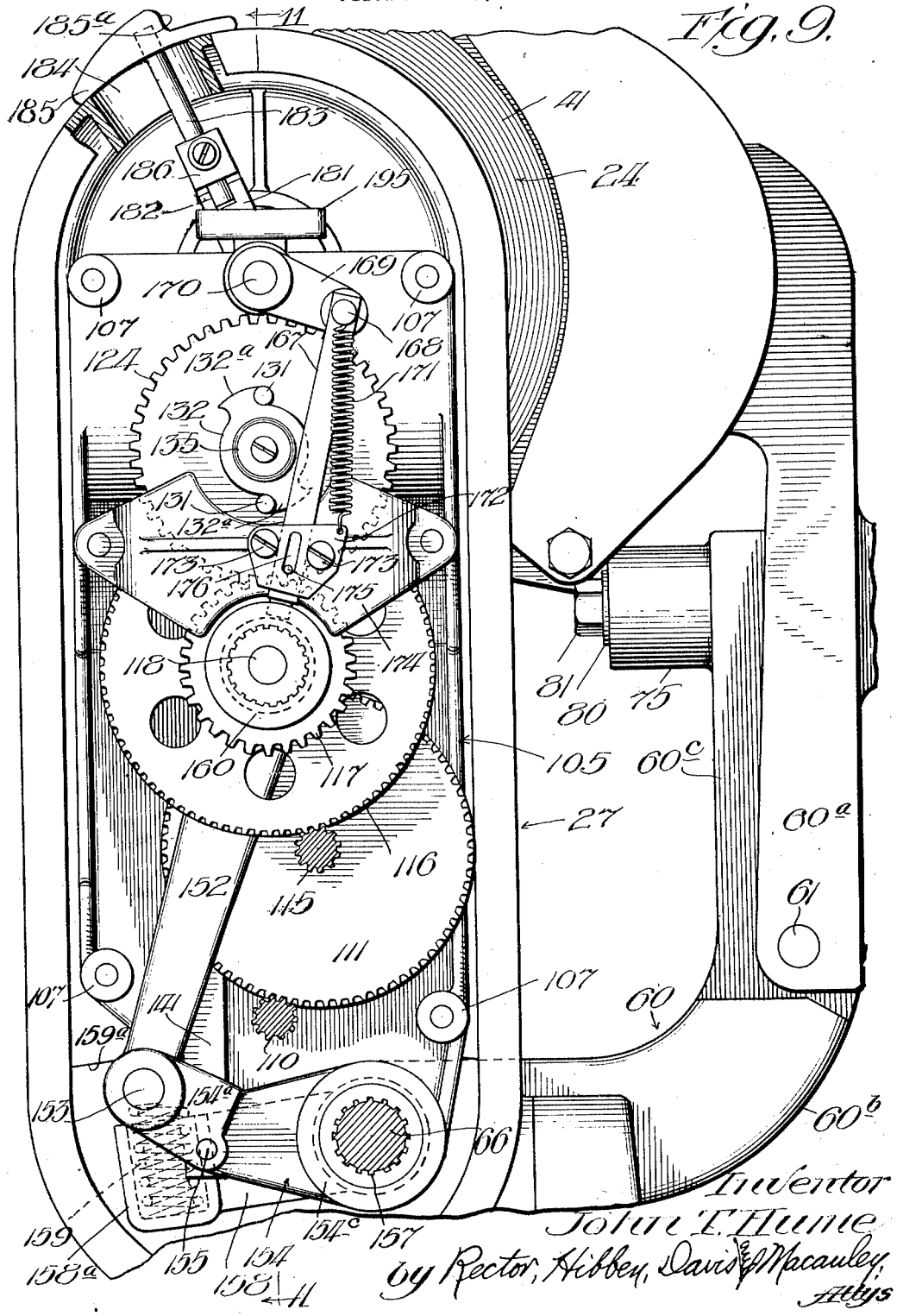

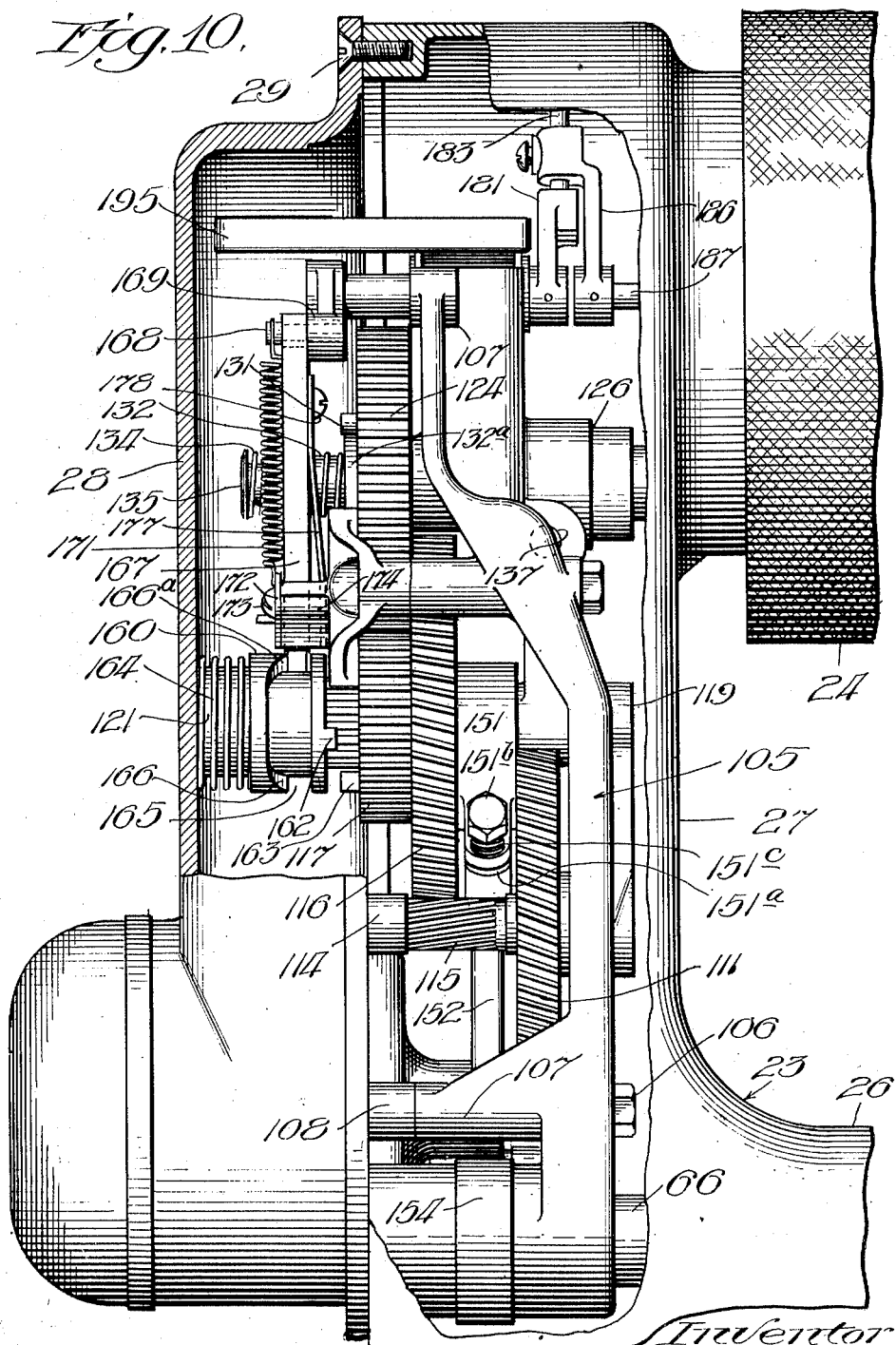

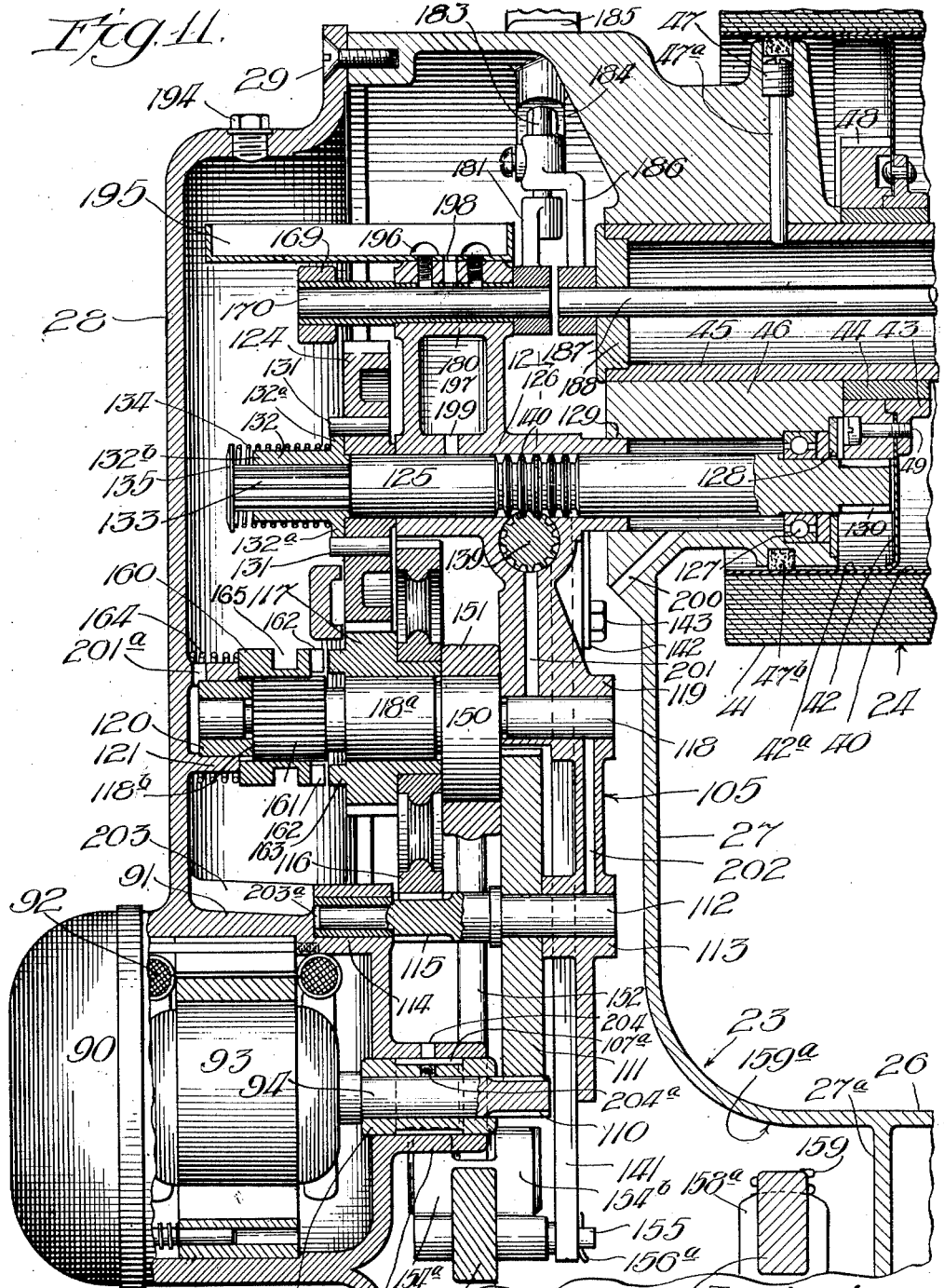

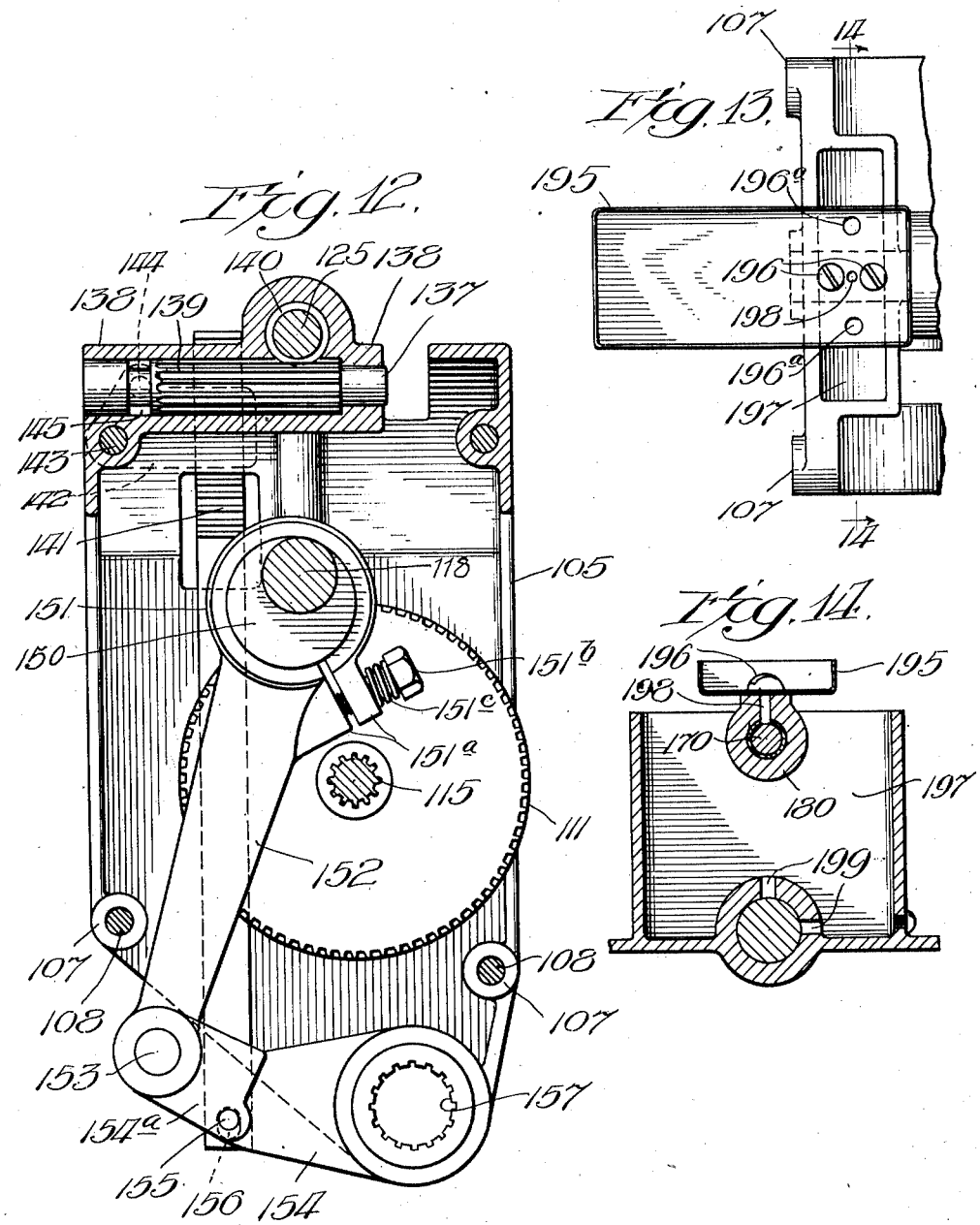

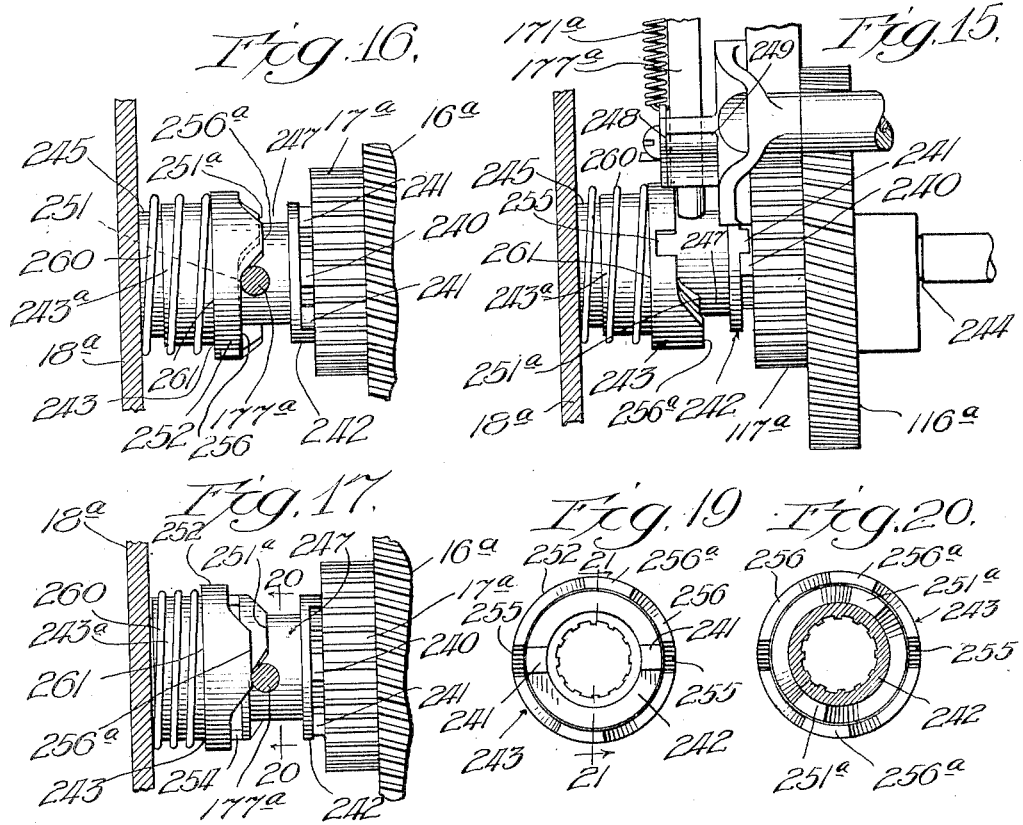
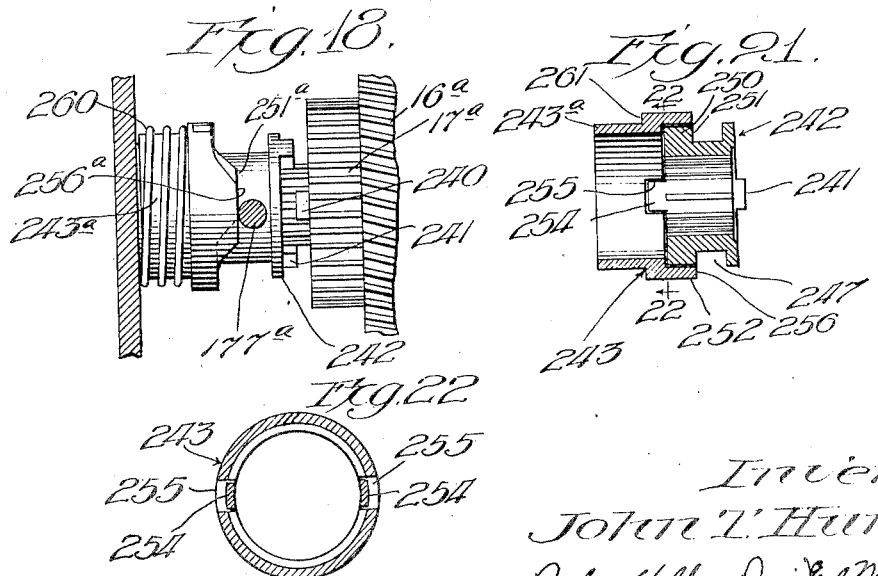

Patented May 14, 1929.

1,712,958

UNITED STATES PATENT OFFICE.

JOHN T. HUME, OF CHICAGO, ILLINOIS, ASSIGNOR TO ELECTRIC HOUSEHOLD UTILITIES CORPORATION, OF CHICAGO, ILLINOIS, A CORPORATION OF ILLINOIS.

IRONING MACHINE.

Application filed November 19, 1924. Serial No. 750,725.

This invention relates to improvements in ironing machines of the type in which relatively movable ironing elements, such as a rotatable roll and a relatively movable shoe, are actuated by power driven means. The principal object of the invention is to provide an ironing machine in which the application of power is regulated automatically in such a manner that the speed of rotation of the roll varies inversely with the dampness of the clothes being ironed. This is effected, in the preferred embodiment, by the use of a series wound electric motor which is so connected that when the load on the ironing roll is relatively heavy due to the relatively great dampness of an article of clothing at the commencement of the operation of ironing it, the series motor automatically produces a relatively large torque to carry the load and at the same time rotates the ironing roll at a relatively low speed which is desirable for securing the best results when the article of clothing is very damp. As the article of clothing becomes drier after a preliminary ironing of it, the load on the ironing roll, being decreased, permits the roll to be driven by the motor at a higher rate of speed. Thus, the speed of the rotation of the ironing roll is at all times inversely proportional to the dampness of the clothing and the consequent load which is imposed upon the roll.

A further object of the invention is to provide improved power driven means for effecting relative movement of the ironing elements and for effecting the rotation of the roll so that the operation of the machine is at all times under the immediate control of the operator. Still another object is to provide improved actuating mechanism whereby the operation of the roll is prevented when the relatively movable shoe is moved out of ironing position. A further object is to provide means for preventing the manipulation of the controlling switch of the motor to stop its operation when the shoe and rotatable roll are in relative ironing positions. Another important feature of the invention is the provision of improved means for effecting lubrication of the actuating mechanism. Other objects relate to various features of construction and arrangement which will appear more fully hereinafter.

The nature of the invention will be understood from the following specification taken with the accompanying drawings in which one embodiment is illustrated together with a modification of certain clutch mechanism. In the drawings, Figure 1 shows a rear elevation of the improved ironing machine, illustrating by dotted lines the positions of the ironing elements when the machine is not in use; Fig. 2 shows an end elevation of the ironing machine, looking toward the right as viewed in Fig. 1, the ironing shoe being moved outwardly from the roll; Fig. 3 is a partial front elevation of the ironing machine, with parts thereof broken away to illustrate the means for effecting movement of the shoe; Fig. 4 is an enlarged section taken on the line 4—4 of Fig. 1, showing the ironing shoe in engagement with the padded roll; Fig. 5 is an end elevation of the upper portion of the ironing machine, looking toward the left as viewed in Fig. 1; Fig. 6 is a detail section on the line 6—6 of Fig. 5; Fig. 7 is a detail section taken on the line 7—7 of Fig. 1; Fig. 8 is a detail section taken on the line 8—8 of Fig. 7; Fig. 9 is an enlarged end elevation of the upper portion of the ironing machine, looking toward the right as viewed in Fig. 1, with the cover of the housing removed to reveal the actuating mechanism; Fig. 10 is an enlarged rear elevation of the upper left hand portion of the ironing machine, as viewed in Fig. 1, with a portion of the housing broken away to reveal the actuating mechanism; Fig. 11 is a longitudinal section taken on the line 11—11 of Fig. 9; Fig. 12 is a detail section taken on the line 12—12 of Fig. 11; Fig. 13 is a top plan view of the bearing frame which is mounted in the housing, showing a part of the lubricating means; Fig. 14 is a section taken on the line 14—14 of Fig. 13; Fig. 15 is a partial sectional view, similar to that of Fig. 11, showing a modified construction of the clutch mechanism by which the driving connection to be operated for moving the shoe, is controlled, the clutch being shown engaged; Fig. 16 is a partial sectional view, similar to that of Fig. 15, showing the clutch members in engaged position; Fig. 17 is a sectional view similar to that of Fig. 16, showing the positions of the parts when the outer clutch member is in its outer disengaged position, while the inner clutch member is still engaged; Fig. 18 is a sectional view similar to that of Figs. 16 and 17, showing the positions of the parts when both of the clutch members have been disengaged; Fig. 19 shows an end elevation of the movable clutch members; Fig. 20 shows a sectional view taken on the line 20—20 of Fig. 17; Fig. 21 shows a longitudinal section taken on the line 21—21 of Fig. 19, and Fig. 22 shows a transverse section taken on the line 22—22 of Fig. 21.

As illustrated in the drawings, the improved ironing machine comprises a supporting standard 20 having oppositely directed base portions 20$^a$ which are supported by castors 21. The standard 20 has mounted in the upper part thereof an axle 22 on which is pivotally supported a frame 23 which carries the rotatable roll 24 and the relatively movable heated ironing shoe 25. The frame 23 is constructed as an L-shaped hollow casing comprising a horizontal housing 26 and an upwardly extending housing 27 separated by a partition wall 27$^a$. The housing 27 is provided on its end face with an opening which is normally closed by a complementary housing cover 28 secured thereto by cap screws 29. For the purpose of permitting the frame 23 to be tilted about the axle 22 to move the ironing elements into the position illustrated by dotted lines in Fig. 1, for convenience in storing the machine when it is not in use, the movement of the frame on the axle is counterbalanced by means of a coil spring 30 which is mounted on the hub 31$^a$ of an adjusting member 31 located within the housing 26, as shown in Fig. 7. One end of the spring 30 is secured to the frame 23 and the other end of the spring is secured to the adjusting member 31 which is splined on the axle 22 as shown at 32. This spring tends to reduce the effort required to move the ironing elements from one position to the other, but when the ironing elements are in either horizontal or vertical position, the weight of these parts is sufficient to overcome the tension of the spring and maintain them in the desired position. In order to permit adjustment of the tension of the spring, one end of the axle 22 is provided with worm teeth 33 which mesh with the worm 34 formed on an adjusting member 35 rotatably mounted in a recess 36 formed in one of the upwardly extending arms of the standard 20. This member 35 is provided with a square head 35$^a$ which may be engaged by a wrench to effect the adjustment of the spring. The side of the standard 20 is suitably recessed as shown at 20$^b$ to accommodate the housing 27 and cover 28, with parts carried thereby, when the ironing elements are tilted to their upright positions. The downward tilting of the ironing elements to the horizontal position is limited by an adjustable cap screw 37 on the frame 23 engaging the shoulder 38 on the standard 20. When the ironing elements are tilted to vertical position, the frame 23 engages a lug 39 on the standard.

The rotatable roll 24 comprises a metal cylinder 40 provided on its outer side with suitable padding 41 and the ends of the cylinder 40 are secured to annular flanges 42$^a$ formed on disks 42 which are secured to hubs 43 provided with bushings 44 adapted to revolve on a stationary shaft 45. This shaft 45 is secured at one end in the block 46 forming a part of the upper portion of the housing 27, as shown in Fig. 11, by means of a set screw 47 having an elongated shank 47$^a$ engaging an aperture in the shaft. A packing ring 47$^b$ surrounds the block 46 to prevent dust from reaching the mechanism within the roll. The roll 24 is actuated by a gear 48 which is secured to the adjacent hub 43 by cap screws 49 and which is seated on the bushing 44 bearing against the end face of the block 46. At the outer end of the roll, as shown in Fig. 6, the stationary shaft 45 has secured thereto a disk 50, this disk substantially closing the opening in the end of the roll and seating against the bushing 44 of the adjacent bearing of the roll to prevent longitudinal movement of the roll on its supporting shaft.

The movable ironing shoe 25 comprises a metal plate 55, of substantially the same length as the roll 25, which is adapted to be concentric with the axis of the roll when it is in engagement with the padded surface thereof, as shown in Fig. 4. The upper and lower edges of the plate 55 are connected on the rear side by a sheet metal wall 56, forming an internal chamber 57 containing suitable gas or electric heating devices 58 for maintaining the plate 55 in a heated condition during the ironing operation. The shoe 25 is carried by a supporting arm 60 comprising an upper part 60$^a$ which is pivoted at 61 on the lower part 60$^b$. The upper part 60$^a$ of the arm is provided with a seat 62 which conforms to the contour of the rear wall 56 of the shoe to which the arm is secured by a bolt 63 passing through a lug 64 and engaging a reinforcing structure 65 secured to the rear side of the plate 55, as shown particularly in Fig. 4. The supporting arm 60 is secured on a horizontal shaft 66 which is located within the horizontal housing 26 and journaled in bearings 67 carried by this housing. The shaft 66 is adapted to be rocked in its bearings by a mechanism hereinafter described in order to move the shoe 25 to and from the padded roll 24. During the movements of the shoe 25 by the rocking of the shaft 66, the upper part 60$^a$ of the supporting arm is normally held in a fixed position with respect to the lower part 60$^b$ but this connection may be manually released by the operator, when desired, to permit a quick movement of the shoe away from the roll, which may be desirable if the hand of the operator is drawn between these ironing elements or when there is a failure of the electric power supply to the motor. In the latter case, the stopping of the motor and resulting stoppage of the rotation of the roll might result in the burning of the padding of the roll, the clothes being ironed, and other surrounding objects, if the heated shoe could not be instantly released from the roll by manually operated means. The upper part 60ª of the supporting arm is divided at its lower end to extend on opposite sides of the upper portion 60ᶜ of the part 60ᵇ, as shown in Fig. 1, and the part 60ᶜ is adapted to extend between the lateral flanges of the part 60ª when the parts are in assembled relation, as shown in Fig. 4. The part 60ª of the supporting arm is provided with two dogs 70 which are pivoted on pins 71 and 72 and arranged to extend through a slot in the wall of the part 60ª to engage the annular notch 73 in a detent 74 which is slidably mounted in a barrel 75 carried at the upper end of the part 60ᶜ. The two dogs 70 are provided with segmental gears 77 which mesh with each other and one of these dogs is fixed to the lower end of an operating handle 78 having its upper end located in proximity to the upper edge of the shoe 25 so that the operator can conveniently reach it to disengage the dogs from the detent 74 and thereby release the shoe from its fixed connection with the lower part 60ᵇ of the supporting arm. In order that the shoe may exert a yielding pressure on the roll 24 or on the clothes passing around the roll, a coil spring 79 is mounted in the barrel 75 around the tubular shank 74ª of the detent and the outer end of this spring engages a washer 80 held in position on the end of the shank by a cap screw 81 which engages the threaded bore of the shank. This cap screw may be adjusted to secure the desired degree of initial compression in the spring 79 and the parts are so arranged that after the shoe engages the surface of the roll, a slight further movement of the rock shaft 66 takes place in order to produce some additional compression in the spring and a consequent yielding pressure between the shoe and the roll. As the clothes pass between the roll and the shoe, the spring permits the shoe to move slightly away from the roll to accommodate the thickness of the clothes being ironed. For the purpose of securing a positive engagement of the dogs 70 with the detent 74 when the shoe is moved upwardly about the pivot 61 with respect to the lower part 60ᵇ of the supporting arm, the head of the detent is provided with a bore having slidably mounted therein a plunger 83 provided at its outer end with a plate 84 adapted to engage the projections 70ª of the dogs 70 and thereby move the hooked extremities of the dogs inwardly toward each other to engage the detent. The plunger 83 is actuated to engage the dogs with a yielding pressure by means of a spring 85 which is mounted in the shank 74ª of the detent between the end of the cap screw 81 and the head of the plunger.

The gear 48 by which the roll 24 is rotated and the rock shaft 66 by which the shoe is moved toward and from the roll are both actuated by power driven mechanism contained within the housing 27 forming the upright portion of the frame 23. This mechanism is driven by an electric motor 90 having its casing 91 formed as a part of the cover 28 of the housing. This motor is provided with a field winding 92 which is connected in series with the winding of the armature 93 so that the speed of the armature and the motor shaft 94 are inversely proportional to the load on the motor and a relatively large torque is produced at the starting of an ironing operation when the load is comparatively heavy, that is, when the clothing between the roll 24 and the shoe 25 is relatively wet. The electric current for driving the motor is supplied through line conductors which are mounted in an insulated cable 95 extending beneath the frame 23, as shown in Fig. 1, and leading through the housing 26 in which is located a circuit controlling switch 96 operated by a lever 97 having a pivotal connection with a plunger 98 extending outwardly through the switch plate 99 secured to the front side of the housing 26, as shown in Fig. 4, and carrying at its outer end a push button 100. The under side of the housing 26 is provided with an electric socket 101 of usual form to which an electric connection may be made from a suitable source of supply and the conductors lead from this socket to the motor through the switch 96. To start the motor in operation, the button 100 is pulled outwardly and the resulting actuation of the rock shaft 66 to move the shoe into engagement with the roll also moves an arm 103, secured on the rock shaft, into position with the end plate 103ª thereof positioned opposite the end of the plunger 98 so that the switch 96 cannot be operated to open the circuit of the motor and stop the rotation of the roll 24 while the shoe 25 is in engagement with the roll, thus overcoming the possibility of burning the padding of the roll or the clothing passing around it by maintaining them in contact with the heated shoe while the roll is stationary. The danger of fire and other damage is thus effectually overcome.

The mechanism for moving the shoe and actuating the roll, which is contained within the housing 27, is supported by bearings which are carried by the housing cover 28 and by a bearing frame 105 secured rigidly thereto by means of cap screws 106 extending through the lugs 107 on the bearing frame and engaging other internally threaded lugs 108 carried by the housing cover 28, so that when the cap screws 29 have been released, the actuating mechanism can be removed with the housing cover 28 and the motor 90, as a unit. This actuating mechanism is driven by the motor shaft 94 which is journaled in a bushing 109 mounted in the hub 109ª of the motor casing. The outer end of the motor shaft has a pinion 110 formed thereon and meshing with a gear 111 which is fixed on a shaft 112 journaled at one end in a bearing 113 carried by the frame 105 and at the other end in a bearing 114 carried by the upper part of the motor casing, as shown in Fig. 11. The shaft 112 is provided adjacent the bearing 114 with a pinion 115 which meshes with a gear 116 fixed on the hub of a pinion 117 rotatably mounted on the enlarged portion 118ª of a shaft 118, journaled at one end in a bearing 119 carried by the frame 105 and at the other end in a bushing 120 carried in a hub 121 extending inwardly from the housing cover 28. The pinion 117 is adapted to drive the mechanism for rotating the roll and also the mechanism by which the rock shaft 66 is operated to effect the movement of the shoe. The driving connection to the roll 24 is made through a gear 124 which meshes with the teeth of the pinion 117 and is rotatably mounted on a shaft 125 journaled in and slidable longitudinally in a bearing 126 carried by the upper part of the frame 105. The shaft 125 is also journaled adjacent its inner end in a bearing 127 and in a packing ring 128 both carried by the lower part of the block 46, into which the extremity of the bearing 126 extends as shown at 129. The inner end of the shaft 125 carries a pinion 130 which meshes with the gear 48 by which the roll 24 is actuated. The driving connection is made between the gear 124 and the shaft 125 through clutch pins 131 which project outwardly from the end face of the gear, as shown in Figs. 9 and 11, to be engaged by the opposite arms 132ª of a clutch member 132 which is slidably and non-rotatably mounted on the reduced end portion of the shaft 125 by means of splines 133. A coil spring 134 is mounted on the hub 132ᵇ of the clutch member and the outer end of this spring seats against a plate 135 secured to the end of the shaft 125, so that the clutch member is normally maintained in driving engagement with the clutch pins 131. The clutch member 132 is moved out of engagement with the clutch pins by the longitudinal movement of the shaft 125 which is effected by means of a shaft 137 journaled in bearings 138 carried by the upper part of the frame 105, as shown in Figs. 11 and 12, and provided with an elongated pinion 139 which meshes with the annular rack teeth 140 formed in the intermediate part of the shaft 125. The pinion 139 also meshes with the teeth of a rack bar 141 which is held in mesh with the pinion by a plate 142 secured to the bearing frame 105 by a cap screw 143, and the plate being provided with a pin 144 which engages an annular groove 145 in the shaft 137, thereby maintaining the shaft in place in its bearings. The rack bar 141 is actuated to rotate the pinion 139 and thereby shift the shaft 125 longitudinally to disengage the clutch 132, through the operation of the mechanism by which the shoe 25 is moved with respect to the roll, so that the movement of the shoe away from the roll automatically disengages the driving connection to the shaft 125, by which the roll is rotated, and the movement of the shoe into engagement with the roll automatically effects the operation of the clutch 132 to cause the rotation of the roll.

The mechanism by which the rock shaft 66 is operated to move the shoe comprises an eccentric 150, shown particularly in Fig. 12, which is secured on or forms a part of the shaft 118 and this eccentric is engaged by an eccentric strap 151 which is formed on the upper end of a rod 152 having its lower end pivoted at 153 to a crank arm 154. The strap 151 is provided with ears 151ª connected by a stud 151ᵇ having a coil spring 151ᶜ mounted beneath its head so that the pressure of the strap on the eccentric may be adjusted. The crank arm 154 comprises two offset angularly disposed parts 154ª and 154ᵇ which carry a pin 155, this pin engaging an elongated slot 156 formed in the lower end of the rack bar 141 which is held thereon by a cotter pin 156ª. The slot 156 permits some lost-motion since the crank arm 154 has a greater movement than that required to operate the clutch 132. The inner end 154ᶜ of the crank arm is splined on the inner end of the rock shaft 66, as shown at 157 in Fig. 9. The movement of the crank arm 154 to effect angular movement of the rock shaft 66 also reciprocates the rack bar 141 due to the engagement of the pin 155 with the elongated slot 156 so that the longitudinal movement of the shaft 125 and the resulting movement of the clutch member 132 is effected simultaneously with the actuation of the rock shaft to move the shoe 25 toward or from the roll 24. To prevent shock to various parts of the machine when the shoe 25 is moved away from the roll, an arm 158 is fixed on the shaft 66, as shown in Figs. 3 and 9, and provided with a cup 158ª containing a coil spring 159 which engages a shoulder 159ª on the housing 23 as the shoe reaches its extreme outer position.

The driving connection between the shaft 118 and the pinion 117, which is driven continuously when the motor 90 is in operation, is effected by means of a clutch 160 which is splined on the enlarged part 118ᵇ of the shaft, as shown at 161. This clutch member is provided with clutch teeth 162 which are adapted to engage other clutch teeth 163 formed on the end face of the pinion 117 and these teeth are normally moved into engagement with each other by a coil spring 164 mounted on the hub 121 and engaging the end of the clutch member. The clutch member is provided with an annular groove 165, one wall of which forms a cam provided with a pair of projections 166 disposed on opposite sides of the shaft 118, as shown in Fig. 10. The groove 165 in the clutch member is adapted to be engaged by the lower extremity of a shifter bar 167, the upper end of which is loosely pivotally connected by a pin 168 with a crank arm 169 mounted on the outer end of a shaft 170 journaled in bearings carried by the upper part of the bearing frame 105. A coil spring 171 is connected at one end to the pin 168 and at the other end to a stationary plate 172 which is secured by screws 173 on a fixed bracket 174 carried by or formed as a part of the bearing frame 105, as illustrated in Fig. 9. The lower end of the shifter bar 167 slides in the guideway formed beneath the plate 172 between the lugs engaged by the screws 173 and its movement is limited by a pin 175 fixed thereon and engaging a longitudinal slot 176 formed in the plate 172. The inner side of the shifter bar 167 has a leaf spring 177 secured thereto by a screw 178, this spring being stronger than the coil spring 164. The lower end of this spring extends inwardly from the shifter bar and contacts with the outer face of the bracket 174, as shown in Fig. 10, thereby maintaining the lower end of the shifter bar in contact with the cam surface of the groove 165 on which the projections 166 are formed and serving also to hold the clutch member 160 outwardly to a sufficient extent to prevent contact of the ends of the clutch teeth 162—163 when the clutch is disengaged. The loose pivotal mounting of the bar 167 permits the action of the spring 177 to obtain this clearance. The shifter bar 167 is operated to control the clutch 160 by effecting an angular movement of the shaft 170 on which the crank arm 169 is fixed. This shaft is journaled in a bearing 180 formed in the upper part of the bearing frame 105 and the inner end thereof carries a relatively fixed crank arm 181 having a notch 182 in its upper end, as shown in Fig. 9, to be engaged by the lower end of a rod 183 which extends through an elongated slot 184 in the upper part of the housing 27. The outer end of the rod 183 is fixed in an operating member 185 which is adapted to slide on the upper curved surface of the housing and which is provided with an upstanding lug 185$^a$ capable of being conveniently engaged by the fingers of the operator for the purpose of moving the rod 183 toward the left, as viewed in Fig. 9, and thereby elevating the crank arm 169 and moving the lower end of the shifter bar 167 out of engagement with the groove 165 in the clutch member 160. When this occurs, the coil spring 164 forces the clutch member inwardly so that the teeth 162 thereof engage the clutch teeth 163 and permit the pinion 117 to drive the shaft 118 through the clutch member. The shaft then begins to rotate and the resulting rotation of the eccentric 150 causes the connecting rod 152 and crank arm 154 to oscillate the rock shaft 66 with the result that the shoe 25 is moved toward the roll 24, assuming that the shoe was away from the roll before the clutch was operated. As soon as the operating member 185 has been manipulated to effect the engagement of the clutch teeth 162 and 163, the operator may instantly release the member 185 and the spring 171 then returns the lower end of the shifter bar into engagement with the outer curved surface 166$^a$ of the lug 166, with which the lower end of the shifter bar was in contact, as shown in Fig. 10, before the actuation of the controlling member 185. Shortly after the rotation of the shaft 118 begins, the clutch member 160 is carried around so that the lower end of the shifter bar 167 again drops into the wide portion of the clutch groove 165, due to the action of the spring 171, and the rotation of the shaft 118 continues for 180 degrees when the clutch member 160 is automatically disengaged from the pinion 117 by the coaction of the lower end of the shifter bar 167 with the other one of the projections 166. The disengagement of the clutch is effected only when the end of the shifter bar 167 reaches the apex of the projection 166. As the clutch rotates, the end of the shifter bar is at first moved inwardly by the inclined cam surface forming the side of the projection and the leaf spring 177 is compressed but when this leaf spring is fully compressed the pressure tending to move the clutch outwardly is greater than the pressure between the clutch teeth tending to maintain them in engagement, and the clutch then snaps to the disengaged position while the springs 177 operates to move the clutch 160 outwardly to a sufficient extent to prevent the clutch teeth 162—163 contacting with each other as the pinion 117 continues to rotate. When this disengagement occurs, the shoe 25 will have been moved into contact with the roll 24 and it is maintained in that position until the clutch member 160 is again operated to produce another half rotation of the shaft 118. The projections 166 on the clutch 160 are so positioned with respect to the eccentric 150 that the clutch is always disengaged with the eccentric either in head-center or dead-center position, thereby holding the clutch 160 against rotation until it is again engaged with the pinion 117. The actuation of the clutch 160 to move the shoe toward the roll, operates simultaneously to start the rotation of the roll through the movement of the rack bar 141 which is loosely pivoted to the crank arm 154 and which rotates the pinion 139 by which the shaft 125 is shifted longitudinally. The movement of the crank arm 154 which moves the shoe toward the roll, rotates the pinion 139 in a clockwise direction, as viewed in Fig. 11, thereby moving the shaft 125 longitudinally and permitting the clutch member 132 to pass into engagement with the clutch pins 135, whereupon the gear 124, being driven continuously by the pinion 117, rotates the shaft 125 and thereby drives the roll through the pinion 130 and the gear 48. If the clutch member 32 engages the ends of the clutch pins 131 as the shaft 125 is moved inwardly, the spring 134 permits the shaft to continue its inward travel and as the gear 124 rotates the pins 131 are carried around until the spring 134 moves the clutch member inwardly to the engaging position shown in Figs. 9 and 11. When the operator wishes to stop ironing, the manually operated member 185 is moved again in the same direction to release the lower end of the shifter bar 167 from the clutch groove 165, thereby causing the clutch to engage the pinion 117 and effect another half rotation of the shaft 118 with the result that the shaft 66 is rocked to move the shoe away from the roll. As this movement takes place, the rack bar 141 moves the shaft 125 toward the left, as viewed in Fig. 11, thereby disengaging the clutch 132 from the pins 131 and stopping the rotation of the roll 24.

In order that the actuating mechanism may be manually controlled at either end of the ironing roll 24, an auxiliary crank arm 186 is fixed on the rod 183, as shown in Figs. 9 and 11, and secured on the inner end of a shaft 187 which extends through the fixed hollow shaft 45 on which the roll 24 is mounted. At its inner end, this shaft 187 is journaled in a bearing 188 mounted in the end of the hollow shaft 45, as shown in Fig. 11, and at the outer end of the ironing roll, the shaft 187 is secured to a cap member 189 by means of a set screw 190. The cap member 189 has a hub 191 which is journaled in a sleeve 192 secured to the end of the shaft 45. The cap member 189 is further provided with a projection 189ª which may be conveniently engaged by the left hand of the operator when in ironing position, for the purpose of imparting movement to the shaft 170 and causing the resulting actuation of the clutch shifter bar 167.

The invention also comprises improved means for lubricating the bearings which are carried by the housing cover 28 and the bearing frame 105. The housing 27 is adapted to be partially filled with oil or grease which is inserted through the hole closed by the plug 194 in the upper part of the housing cover and which may be drained out by removing a plug 194ª in the lower part of the housing. The partition 27ª keeps the oil out of the housing 26. This oil contained in the housing 27 is adapted to find its way to all of the bearings of the driving mechanism. When the ironing elements are tilted to the upright position illustrated by dotted lines in Fig. 1, a portion of the oil contained in the housing, being then located in the housing cover 28, finds its way into the oil pan 195 which is secured to the upper part of the bearing frame 105 by means of the screws 196, so that when the machine is again tilted to the horizontal position the pan 195 is partially filled with oil. This oil is adapted to flow from the pan 195 through the openings 196ª into the oil pocket 197 which is formed in the bearing frame beneath the bearing 180 with upwardly extending openings on opposite sides of the bearing, as shown in Fig. 13. Oil may also pass from the pan 195 through a suitable opening 198 directly to the bearing surface of the shaft 170. The oil collected in the pocket 197 is adapted to pass through an oil hole 199 to oil the bearing 126 of the shaft 125. The passage of oil from this bearing into the end of the ironing roll 24 is prevented by the bearing 127 and packing member 128, previously referred to, and any oil which collects in the bearing block 46 adjacent the member 127 is adapted to flow back into the housing 27 through the opening 200. The oil from the bearing of the shaft 125 is adapted to find its way from the region of the annular rack teeth 140 to the bearing of the shaft 137 and the pinion 139 and, from the space in which this shaft and pinion are mounted, the oil passes downwardly through a passageway 201 to the bearing 119 of the shaft 118. The bearing of the shaft 118 in the hub 121 is adapted to be lubricated directly through an oil hole 201ª by the oil which is in the housing and which flows into the housing cover 28 when the machine is tilted into the upright position. From the bearing 119, another oil passageway 202 leads downwardly to the bearing 113 of the shaft 112. The bearing at the other end of the shaft 112 is adapted to be lubricated from an oil pocket 203 which is formed in the housing cover 28 above the motor casing 91 and which communicates directly with the open end of the bushing 114, as shown at 203ª. The bearing of the motor shaft 94 is supplied with oil through an oil hole 204 communicating with an annular groove 107ª in the bushing 107 which has a hole therein filled by a wick 204ª. In this way, a positive gravity oil feed is provided for each of the bearings and the supply of oil in the pan 195 is automatically replenished each time the frame and ironing elements are tilted upwardly after use and subsequently lowered again for another job of ironing.

The clothes to be ironed are passed into engagement with the roll 24, which rotates in a counter-clockwise direction, as viewed in Fig. 5, over the surface of a table 205 which is secured at the right hand end of the machine, as viewed in Fig. 3, to a supporting bracket 206 provided with pivot pins 207 which are journaled in lugs 208 formed on the housing 27, thus permitting the table 205 to be swung away from the roll 24. When the table 205 is in its normal position, the inclined edge 205ª thereof is in proximity to the surface of the roll and the table may be fixed in this position by means of a bracket 209 which is secured thereto at the end opposite the bracket 206 and provided with means for forming a fixed connection with the shaft 45. The bracket 209 is provided with a curved surface adapted to fit over the sleeve 192 on the end of the shaft 45 and a pin 210 mounted in the bracket is adapted to engage an aperture 211 extending through the sleeve 192 and the shaft 45, as shown in Fig. 6. The bracket 209 is also provided with a horizontally slidable plunger 213 having an enlarged head 214 which is normally actuated by a coil spring 215 to engage a notch 216 formed in the side of the sleeve 192 and the shaft 45. The plunger 213 may be withdrawn by an operating handle 217 and the bracket 209 may then be tilted upwardly to a sufficient extent to remove the lug 210 from the hole 211.

After passing between the roll 24 and the shoe 25, the clothes drop downwardly on to a sheet metal shelf 220 which is located beneath the shoe and the roll, as shown in Figs. 1 and 2, and provided with an upwardly extending flange 221 at its rear side to maintain the clothes out of contact with the support 60 of the ironing shoe. The forward edge of the shelf is also preferably inclined upwardly as shown at 222.

The ironing table 205 is preferably provided with a clothes supporting bar or rack 225 which may be formed of wood and provided on its upper and lower sides with metal plates 226 pivotally mounted on a pin 227 journaled in lugs 228 carried by the bracket 206, so that the bar 225 may be swung beneath the table 205 when not in use and may be moved outwardly to support the ironed clothes when the machine is in operation. The bar 225 is adapted to be secured in its inoperative position by means of a plunger 229 which is actuated by a spring 230 to engage a notch 231 in a plate 232, secured to the under side of the ironing table, as shown in Fig. 5. The plunger 229 is adapted to be operated by a handle 233 located on the under side of the clothes supporting bar.

When the ironing machine is not in use the frame may be tilted upwardly, as shown in Fig. 1, in order to cause the ironing elements to occupy the least possible floor space and when it is desired to use the machine, it may be conveniently moved about on the floor of the room since the standard 20 is mounted on casters 21. The spring balance of the frame 23 on the standard 20 permits the frame and the ironing elements to be tilted conveniently from one position to the other. One end of the roll 24 is free so that clothes can be passed over it without interference by either the shoe or the table. As heretofore explained, the starting and stopping of the machine, independently of the starting and stopping of the motor, is effected through the manual manipulation of the single operating member 185 or through the operation of the complementary member 189 located at the other end of the roll. The shifting of the bar 167 to control the clutch 160 moves the shoe toward or from the roll and at the same time starts or stops the rotation of the roll, thus insuring the rotation of the roll when the heated shoe is in contact with it. As a precaution against the stopping of the motor by the actuation of its controlling switch 96, the arm 103 is provided on the rock shaft 66 so that after the shoe has once been moved into ironing contact with the roll, it is impossible to interrupt the circuit of the motor without first actuating the clutch mechanism to move the shoe away from the roll. As a further safety device, the shoe supporting structure is so constructed that the handle 78 may be conveniently manipulated by the operator at any time to move the shoe out of engagement with the roll without stopping the rotation of the roll, which may be desirable, for example, to permit cleaning of the shoe and roll, to permit changing the padding on the roll, to prevent injury to the fingers of the operator or to prevent burning of the clothes or padding by the stopping of the roll in case there is a failure of the electric power when the heated shoe is in contact with the roll.

In Figs. 15 to 22, inclusive, of the drawings, there is illustrated a modified form of the clutch mechanism for controlling the driving connection between the continuously rotating pinion and the shaft carrying the eccentric by which the shoe is moved toward and from the roll. In these figures of the drawings, there are illustrated only those parts of the machine which have to do with the operation of the clutch mechanism, although it will be understood that the remaining parts of the ironing machine are like those illustrated in Figs. 1 to 14, inclusive. In the modified form of the clutch mechanism, a pinion 117ª is driven continuously by a gear 116ª which in turn is actuated continuously by the driving motor when the ironing machine is in operation, and the pinion 117ª is provided with clutch teeth 240 which are adapted to be engaged by other clutch teeth 241 mounted on a clutch member 242. An outer clutch member 243 is mounted on the inner clutch member 242 and both of these clutch members are mounted on a shaft 244, corresponding to the shaft 118 previously described. The outer end of the shaft 244 is journaled in a bearing 245 carried by the housing cover 18ª and the inner clutch member 242 is splined on the shaft, as indicated in Figs. 19, 20 and 21. The inner clutch member 242 is provided with a cam groove 247 adapted to be engaged by the lower end of a shifter bar 177ª operated by a lever mechanism of the form previously described and held normally in its lower position by a coil spring 171ª. The lower end of the shifter bar 177ª is adapted to slide in a guideway 248 formed in a bracket 249. The inner clutch member 242 is provided on the outer side of the groove 247 with an annular flange 250 having an end surface 251 and the flange 250 is adapted to seat within the annular flange 252 formed on the outer clutch member 243. The outer clutch member is held in non-rotative engagement with the inner clutch member by means of lugs 254 which engage slots 255 in the outer clutch member, as shown in Fig. 21, and the end face of the flange 252 has a surface 256. A coil spring 260 is mounted on the sleeve portion 243ª of the outer clutch member and extends between the shoulder 261 on the clutch member and the adjacent face of the housing cover 18ª, so that the spring tends normally to force the clutch members inwardly toward the driving pinion 117ª. When the clutch teeth 241 are disengaged from the clutch teeth 240 the parts are in the position illustrated in Fig. 18 with the lower end of the shifter bar 177ª engaging the projections 251ª and 256ª on the cam surfaces 251 and 256, respectively. When it is desired to move the shoe with respect to the roll, the operator elevates the shifter bar 177ª, thereby permitting the spring 260 to force both clutch members inwardly until the clutch teeth 241 engage the clutch teeth 240. If the shifter bar 177ª is promptly released, the lower end thereof will ride at first on the peripheral surface of the flange 252 of the outer clutch member, but after a limited movement of the clutch members in an angular direction, the shifter bar will drop, under the influence of the spring 171ª into the clutch groove 247 and will continue in engagement with the clutch groove until the clutch teeth are disengaged. The positions of the parts with the clutch teeth engaged are illustrated in Fig. 15 where the end of the shifter bar 177ª is shown slightly out of contact with the end surfaces 251 and 256 of the movable clutch members. The disengagement of the clutch teeth is effected by the action of the lower end of the shifter bar 177ª on the projections 251ª and 256ª of the end surfaces formed on the clutch members, these projections having cam surfaces which are so arranged that the shifter bar moves the outer clutch member 243 before the inner clutch member 242 is disengaged. As the clutch members approach the end of a half revolution corresponding to a head-center or a dead-center position of the eccentric driven by the shaft 244, the shifter bar 177ª first engages the inclined face of the cam projection 256ª, as shown in Fig. 16, thereby forcing the outer clutch member 243 outwardly until it reaches the position illustrated in Fig. 17, while the inner clutch member 242 is still in its engaging position with the teeth 241 engaging the teeth 240. Further rotation of the shaft 244 and the inner clutch member 242 results in the coaction of the lower end of the shifter bar 177ª with the inclined face of the cam projection 251ª, as shown in Fig. 17, with the result that the inner clutch member 242 is moved outwardly until it reaches the disengaged position shown in Fig. 18. After the clutch teeth 240 and 241 are disengaged, the momentum of the clutch member 242 is sufficient to carry it around until the shifter bar rides over the inclined cam surface on the projection 251ª to the position shown in Fig. 18 thereby holding the clutch member 243 in a position wherein the teeth 241 clear the teeth 240 during the continued operation of the machine. Any slight tilting of the clutch member 243 on the shaft 244, due to the action of the spring 260 while one edge of the member 243 is held by the shifter bar 177ª, is not transmitted to the inner clutch member 242 because of a small clearance which is preferably provided between the clutch members, as shown in Fig. 21, thus preventing the teeth 241 from being touched by the teeth 240 as the pinion 117ª rotates.

Although but one form of the improved ironing machine has been illustrated, together with a modification of a part thereof, it will be understood that the invention may be constructed in various other embodiments within the scope of the appended claims.

I claim:

1. The combination in an ironing machine of a rotatable roll, a shoe adapted to cooperate with said roll, means for driving said roll, and means associated with said driving means for automatically maintaining the speed of rotation thereof inversely proportional to the dampness of the clothes being ironed.

2. The combination in an ironing machine of relatively movable ironing elements, one of which is heated and one of which is rotatable, a motor connected to drive said rotatable ironing element, and means embodied in said motor for inherently regulating said motor to maintain the speed of rotation thereof inversely proportional to the resistance opposing the rotation thereof.

3. The combination in an ironing machine of a rotatable roll, a shoe adapted to cooperate with said roll during the ironing operation, and a series wound electric motor connected to drive said roll.

4. The combination in an ironing machine of relatively movable ironing elements, one of which is rotatable, a rock shaft, a support upon which one of said ironing elements is mounted, said support being mounted on said rock shaft, an electric motor, means actuated by said electric motor for driving said rotatable element and for turning said rock shaft, an electric circuit for said motor, a switch for controlling said circuit, said switch comprising a plunger adapted to be operated to open the switch, and an arm mounted on said rock shaft and adapted to be located in alignment with said plunger to prevent the operation thereof when said ironing elements are in contact.

5. The combination in an ironing machine of a supporting standard, a frame, ironing elements carried by said frame, an axle carried by said standard and pivotally supporting said frame, and a spring mounted around said axle and connected to said frame operatively connected with said standard for controlling the pivotal movement of said frame.

6. The combination in an ironing machine of a supporting standard, a frame, ironing elements carried by said frame, an axle carried by said standard and pivotally supporting said frame, a spring connected between said axle and said frame for controlling the pivotal movement of said frame, and means for adjusting the tension of said spring.

7. The combination in an ironing machine of a pair of ironing elements, one of said ironing elements being movable, a support for said movable element, a rock shaft on which said support is mounted, means for actuating said rock shaft, said support comprising relatively movable parts, means for securing said parts normally in relatively fixed positions, and manually operated means for releasing said securing means to permit movement of said movable element away from the other ironing element independently of the operation of said rock shaft.

8. The combination in an ironing machine of a rock shaft, a supporting member fixed on said rock shaft and having a relatively movable part, an ironing element mounted on said relatively movable part, a detent carried by said supporting member, a pair of jaws carried by said relatively movable part and adapted to engage said detent, and an angularly movable arm for operating said jaws.

9. The combination in an ironing machine of a movable ironing element, a support for said element, said support comprising pivotally connected parts, a resiliently mounted detent carried by one of said parts, and manually operated dog mechanism carried by the other of said parts for engaging said detent.

10. The combination in an ironing machine of relatively movable ironing elements, a supporting arm for one of said elements, said arm comprising relatively movable parts, means for resiliently connecting said parts, and means for releasing said connection to permit separation of said ironing elements.

11. The combination in an ironing machine of relatively movable ironing elements, a support for said ironing elements, said support comprising pivotally connected parts, a detent mounted on one of said parts, a pair of dogs pivotally mounted on the other of said parts, an operative connection between said dogs, and manually operated means for controlling the actuation of said dogs.

12. The combination in an ironing machine of relatively movable ironing elements, a support for one of said ironing elements, said support comprising pivotally connected parts, a detent mounted on one of said parts, a pair of dogs pivotally mounted on the other of said parts, an operative connection between said dogs, manually operated means for controlling the actuation of said dogs, and means for insuring the engagement of said dogs with said detent when they are brought into proximity thereto.

13. The combination in an ironing machine of a pair of relatively movable ironing elements, a support for one of said elements, said support comprising relatively movable parts, a barrel mounted on one of said parts, a detent having a stem slidably mounted in said barrel, a spring mounted on said stem in said barrel, means engaging the end of said spring and secured to the end of said stem, and latch mechanism carried by the other part of said support and adapted to engage said detent.

14. The combination in an ironing machine of a rock shaft, a supporting member fixed on said rock shaft and having a relatively movable part, an ironing element mounted on said relatively movable part, a detent carried by said supporting member, a pair of jaws carried by said relatively movable part and adapted to engage said detent, an angularly movable arm for operating said jaws, and means for resiliently supporting said detent to permit a limited relative movement of said part of said support when said jaws are in engagement with said detent.

15. The combination in an ironing machine of a rock shaft, a supporting member fixed on said rock shaft and having a relatively movable part, an ironing element mounted on said relatively movable part, a detent carried by said supporting member, a pair of jaws carried by said relatively movable part and adapted to engage said detent, and an angularly movable arm for operating said jaws, said operating member being curved upwardly and adapted to occupy a position over said ironing element when said jaws are in engagement with said detent.

16. The combination in an ironing machine of a housing, an ironing element carried by said housing, a part of said housing being removable, a motor carried by said removable part of said housing, and actuating mechanism for said ironing element driven by said motor and removable as a unit with said removable part of said housing.

17. The combination in an ironing machine of a housing, an ironing element carried by said housing, a removable cover for said housing, a bearing frame attached to said cover, and actuating mechanism for said ironing element carried by the said cover and said bearing frame.

18. The combination in an ironing machine of a housing, an ironing element carried by said housing, a motor having its casing forming a part of said housing, and actuating mechanism driven by said motor within said housing for operating said ironing element.

19. The combination in an ironing machine of a housing, an ironing element carried by said housing, a removable cover for said housing, a motor having its casing formed as an integral part of said cover, and actuating mechanism driven by said motor and carried by said cover for actuating said ironing element.

20. The combination in an ironing machine of a rotatable roll, an ironing shoe, a support for said shoe, a rock shaft on which said support is mounted, a driving member, operating mechanism connecting said driving member with said rock shaft, a clutch for controlling said operating mechanism, manually operated means for controlling the operation of said clutch, actuating means connecting said driving member to rotate said roll, a clutch for controlling said actuating means, and means actuated by the movement of said rock shaft for effecting the actuation of said last named clutch.

21. The combination in an ironing machine, of a rotatable roll, a gear movable with said roll, a driving shaft, a pinion carried by said shaft and meshing with said gear, a driving member, means comprising a clutch for forming a connection between said driving member and said shaft, and means for moving said shaft longitudinally to effect the operation of said clutch.

22. The combination in an ironing machine, of a rotatable roll, a shaft for driving said roll, operating mechanism for driving said shaft, a clutch for controlling said operating mechanism, said shaft being provided with annular rack teeth, a pinion meshing with said rack teeth, and a rack bar meshing with said pinion for moving said shaft longitudinally to effect the operation of said clutch.

23. The combination in an ironing machine, of a rotatable roll, a shaft for driving said roll, means for driving said shaft, a a clutch controlled by the longitudinal movement of said shaft for controlling the actuation of said shaft by said driving means, said shaft being provided with annular rack teeth, a pinion meshing with said teeth, a rack bar meshing with said pinion, a shoe movable into engagement with said roll, means for effecting movement of said shoe, and means actuated by said last named means for operating said rack bar to effect longitudinal movement of said shaft.

24. The combination in an ironing machine, of a rotatable roll, a relatively movable ironing shoe, a driving shaft for said roll, a driving member, an operating connection from said driving member to said shaft, a clutch for controlling said operating connection, means actuated by said driving member for moving said shoe toward and from said roll, and means actuated by the movement of said shoe for moving said shaft longitudinally to effect the operation of said clutch.

25. The combination in an ironing machine, of a rotatable roll, an ironing shoe, a driving member, a shaft for operating said roll, an operating connection from said driving member to said shaft, a clutch for controlling said operating connection, actuating means for moving said shoe to and from said roll, a second clutch for controlling the connection between said driving member and said actuating means, manually operated means for controlling the actuation of said second-named clutch, and means actuated by the operation of said actuating means for effecting longitudinal movement of said shaft to operate said first-named clutch.

26. The combination in an ironing machine, of a roll, a relatively movable ironing shoe, an operating connection for effecting movement of said shoe, a driving member, a clutch adapted to form a driving connection between said driving member and said operating connection, said clutch being provided with an annular groove having a cam surface, a shifter bar adapted to engage said cam groove, manually operated means for withdrawing said shifter bar from said groove, and spring-actuated means for effecting the operation of said clutch when said shifter bar is withdrawn.

27. The combination in an ironing machine, of a roll, a relatively movable ironing shoe, an operating connection for effecting movement of said shoe, a driving member, a clutch adapted to form a driving connection between said driving member and said operating connection, said clutch being provided with an annular groove having a cam surface, a shifter bar adapted to engage said cam groove, manually operated means for withdrawing said shifter bar from said groove, spring-actuated means for effecting the operation of said clutch when said shifter bar is withdrawn, and other spring-actuated means for automatically returning said shifter bar into engagement with said groove after a predetermined operation of said operating connection.

28. The combination in an ironing machine of ironing elements, a housing, driving mechanism contained in said housing for actuating said elements, bearing members in said housing for movable parts of said mechanism, said bearing members having oil passages therethrough, means for supporting said housing and said ironing elements to permit bodily movement of said ironing elements from an inoperative position to an operating position, and means actuated by said movement for supplying oil to said oil passages.

29. The combination in an ironing machine of ironing elements, actuating mechanism for said elements, a frame having bearings for said mechanism and passages connecting said bearings, means for permitting a tilting movement of said ironing elements to and from a normal operating position, and means actuated by said tilting movement for automatically renewing the supply of oil to said bearings and said passages.

30. The combination in an ironing machine, of ironing elements, actuating mechanism for said elements, a housing containing said mechanism, a frame located in said housing and having bearings for said mechanism, said frame having passages connecting said bearings, an oil pan for supplying oil to said bearings and said passages, said housing being adapted to contain oil, and means to permit the tilting of said housing and said ironing elements to an inoperative position wherein said oil pan is supplied with oil from the oil contained in said housing.

31. The combination in an ironing machine, of a frame, an axle fixed in said frame, a roll rotatably mounted on said axle, a shoe movable toward and from said roll, driving mechanism for effecting the actuation of said roll and said shoe, manually operated means located at one end of said roll for controlling said driving mechanism, and other manually controlled means extending through said axle for permitting the control of said driving mechanism from the other end of said roll.

32. The combination in an ironing machine, of a frame, an axle fixed in said frame, a roll rotatably mounted on said axle, actuating mechanism for said roll, a shaft extending through said axle, manually operated means connected to said shaft at one end of said roll, and means actuated by said shaft at the other end of said roll for controlling the operation of said actuating mechanism.

JOHN T. HUME.